(12) United States Patent
Chisholm et al.

(10) Patent No.: US 7,312,290 B2
(45) Date of Patent: Dec. 25, 2007

(54) CURABLE FORMULATIONS, CURED COMPOSITIONS, AND ARTICLES DERIVED THEREFORM

(75) Inventors: Bret Ja Chisholm, Clifton Park, NY (US); James Edward Pickett, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 400 days.

(21) Appl. No.: 10/951,336

(22) Filed: Sep. 24, 2004

(65) Prior Publication Data

US 2006/0069222 A1 Mar. 30, 2006

(51) Int. Cl.
*C08F 20/38* (2006.01)
*C08F 118/02* (2006.01)

(52) U.S. Cl. ............. 526/257; 526/217; 526/229; 526/230; 526/259; 526/286; 526/319; 526/320; 526/321; 526/323.1; 526/325; 526/326; 526/329.6

(58) Field of Classification Search ........... 526/217, 526/229, 230, 286, 319, 320, 321, 323.1, 526/323.2, 325, 326, 329.6, 257, 259
See application file for complete search history.

(56) References Cited

U.S. PATENT DOCUMENTS 4,578,445 A  3/1986  Sakagami et al.
5,880,170 A * 3/1999  Imura et al. ............... 522/104
6,569,916 B2 * 5/2003  Kim ........................... 522/167

FOREIGN PATENT DOCUMENTS

| JP | 2 247212 | 10/1990 |
| JP | 2 258819 | 10/1990 |
| JP | 07-206944 | * 8/1995 |
| WO | WO 96/38486 | 12/1996 |

OTHER PUBLICATIONS

U.S. Appl. No. 10/065,981, filed on Dec. 6, 2002, entitled Brightness Enhancement Film With Improved View Angle.
U.S. Appl. No. 10/897,364, filed on Jul. 21, 2004, entitled High Refractive Index, UV-curable Monomers and Coating Compositions Prepared Therefrom.
PCT International Search Report dated Jan. 16, 2006.

* cited by examiner

*Primary Examiner*—Helen L Pezzuto

(57) ABSTRACT

Curable formulations comprising: (a) at least one multifunctional acrylate having a functionality of at least two, (b) at least one mono-acrylate monomer, (c) at least one heteroatom-containing diacrylate, wherein the heteroatom is sulfur or selenium; and (d) a curing agent, have been discovered. The curable formulations show promise as precursors to high refractive index materials suitable for use in light management devices and other optical devices. In addition the novel curable formulations are useful for producing coatings, which may be useful in forming display films, in particular brightness enhancing display films.

15 Claims, No Drawings

CURABLE FORMULATIONS, CURED COMPOSITIONS, AND ARTICLES DERIVED THEREFORM

BACKGROUND

This invention relates to curable formulations and cured compositions that are useful for producing coatings and in forming display films, in particular brightness enhancement films.

Brightness enhancement films have broad applications for flat panel displays in consumer electronics devices, such as laptop computers, televisions, projection displays, traffic signals, illuminated signs, camcorders, and the like. For example, in backlight displays, brightness enhancement films use prismatic structures replicated on the film surface to direct light along the viewing axis (that is, normal to the display), which enhances the brightness of the light viewed by the user of the display, and which allows the system to use less power to create a desired level of on-axis illumination. Typically, brightness enhancement films are made of plastic materials which are optically transparent and which comprise patterned surface features sometimes referred to as surface microstructure. One of the advantages of using plastic films for such applications is that, in principle, physical features of the films such as surface microstucture may be created using simple and effective techniques such as molding.

Optical materials and optical products, such as display films are advantageously prepared from high refractive index materials (typically materials having a refractive index of greater than or equal to about 1.6), such as polymerizable, high refractive index monomers and curable compositions containing such high refractive index monomers.

Useful high refractive index monomers include bromine-substituted aromatic (meth)acrylate monomers, such as, for example, those described in U.S. Pat. No. 4,578,445. High refractive index monomers are typically materials that exist in a crystalline or otherwise solid form under ambient conditions (ambient temperature) and have relatively high melting or softening points. Often such materials have melting or softening points significantly above ambient temperature. Typically, curable formulations must be substantially homogeneous in order to be processed into optical devices such as light management films. Thus, a curable formulation comprising monomers having melting points significantly above ambient temperature must either dissolve in the curable formulation, or the curable formulation must be heated to a temperature at which the curable formulation becomes substantially homogeneous. Heating a curable formulation during processing may significantly increase the cost and complexity of the processing. For example, it may be necessary that transfer lines used in a processing step be heated. Providing heated transfer lines increases the overall energy consumption of the process, and can increase the risk of transfer line failure (particularly at joints and valves) with the subsequent release of volatile organic compounds into the workplace and the greater environment. If uniform heating is not consistently maintained, the monomers having melting points significantly higher than ambient temperature may crystallize within the curable composition during processing, resulting in blockages in transfer lines or the production of a non-uniform and typically unusable product which must be disposed of. Further, maintaining the curable formulation at a temperature sufficient to maintain homogeneity may result in premature polymerization of the components of the curable formulation. These added process requirements and the negative consequences attendant thereupon increase the cost and complexity of producing a cured composition having a high refractive index.

Furthermore, a curable formulation designed for use in a brightness enhancing film produced using modem microreplication processes must be a fluid which is typically free of solvent. Moreover, the fluid curable formulation must have the appropriate level of viscosity. Typically, the viscosity required of curable formulations used in microreplication processes is less than about 5,000 centipoises, preferably less than 1,500 centipoises at 25° C. In addition, a cured coating composition prepared from a curable formulation should have a relatively high refractive index, typically about 1.6 or higher; a glass transition temperature of less than about 100° C.; and suitable ductility, stiffness, dimensional stability, and adhesion strength to be useful in applications such as brightness enhancement films.

Therefore, it would be advantageous to discover substantially homogeneous curable formulations that are liquids at ambient temperature, that have a viscosity appropriate to the processing requirements of many different applications, including the production of optical films having replicated surface microstructures, and that can be processed as a liquid at temperatures at or near ambient temperature. Such curable formulations would be useful in the production of cured compositions for optical devices, such as high refractive index brightness enhancing films.

BRIEF DESCRIPTION

In one aspect, the present invention provides a curable formulation comprising (a) at least one multifunctional acrylate having a functionality of at least two, (b) at least one mono-acrylate monomer, (c) at least one heteroatom-containing diacrylate, wherein the heteroatom is selected from the group consisting of sulfur and selenium, and (d) at least one curing agent.

In another aspect, the present invention provides an optical article comprising a cured acrylate composition, said composition comprising structural units derived from (a) at least one multifunctional acrylate having a functionality of at least two, (b) at least one mono-acrylate monomer, and (c) at least one heteroatom-containing diacrylate, wherein the heteroatom is selected from the group consisting of sulfur and selenium.

In yet another aspect the present invention provides a cured composition comprising structural units derived from (a) at least one multifunctional acrylate having a functionality of at least two, (b) at least one mono-acrylate monomer, and (c) at least one heteroatom-containing diacrylate, wherein the heteroatom is selected from the group consisting of sulfur and selenium.

DETAILED DESCRIPTION

The present invention may be understood more readily by reference to the following detailed description of preferred embodiments of the invention and the examples included therein. In the following specification and the claims which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "aliphatic radical" refers to a radical having a valence of at least one comprising a linear or branched array of atoms which is not cyclic. The array may include heteroatoms such as nitrogen, sulfur, silicon, selenium and oxygen or may be composed exclusively of carbon and hydrogen. Aliphatic radicals may be "substituted" or "unsubstituted". A substituted aliphatic radical is defined as an aliphatic radical which comprises at least one substituent. A substituted aliphatic radical may comprise as many substituents as there are positions available on the aliphatic radical for substitution. Substituents which may be present on an aliphatic radical include but are not limited to halogen atoms such as fluorine, chlorine, bromine, and iodine. Substituted aliphatic radicals include trifluoromethyl, hexafluoroisopropylidene, chloromethyl; difluorovinylidene; trichloromethyl, bromoethyl, bromotrimethylene (e.g. —$CH_2CHBrCH_2$—), and the like. For convenience, the term "unsubstituted aliphatic radical" is defined herein to encompass, as part of the "linear or branched array of atoms which is not cyclic" comprising the unsubstituted aliphatic radical, a wide range of functional groups. Examples of unsubstituted aliphatic radicals include allyl, aminocarbonyl (i.e. —$CONH_2$), carbonyl, dicyanoisopropylidene (i.e. —$CH_2C(CN)_2CH_2$—), methyl (i.e. —$CH_3$), methylene (i.e. —$CH_2$—), ethyl, ethylene, formyl, hexyl, hexamethylene, hydroxymethyl (i.e. —$CH_2OH$), mercaptomethyl (i.e. —$CH_2SH$), methylthio (i.e. —$SCH_3$), methylthiomethyl (i.e. —$CH_2SCH_3$), methoxy, methoxycarbonyl, nitromethyl (i.e. —$CH_2NO_2$), thiocarbonyl, trimethylsilyl, t-butyldimethylsilyl, trimethyoxysilypropyl, vinyl, vinylidene, and the like. Aliphatic radicals are defined to comprise at least one carbon atom. A $C_1$-$C_{10}$ aliphatic radical includes substituted aliphatic radicals and unsubstituted aliphatic radicals containing at least one but no more than 10 carbon atoms.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. Aromatic radicals may be "substituted" or "unsubstituted". A substituted aromatic radical is defined as an aromatic radical which comprises at least one substituent. A substituted aromatic radical may comprise as many substituents as there are positions available on the aromatic radical for substitution. Substituents which may be present on an aromatic radical include, but are not limited to halogen atoms such as fluorine, chlorine, bromine, and iodine. Substituted aromatic radicals include trifluoromethylphenyl, hexafluoroisopropylidenebis(4-phenyloxy) (i.e. —$OPhC(CF_3)_2PhO$—), chloromethylphenyl; 3-trifluorovinyl-2-thienyl; 3-trichloromethylphenyl (i.e. 3-$CCl_3$Ph-), bromopropylphenyl (i.e. $BrCH_2CH_2CH_2$Ph-), and the like. For convenience, the term "unsubstituted aromatic radical" is defined herein to encompass, as part of the "array of atoms having a valence of at least one comprising at least one aromatic group", a wide range of functional groups. Examples of unsubstituted aromatic radicals include 4-allyloxyphenoxy, aminophenyl (i.e. $H_2$NPh-), aminocarbonylphenyl (i.e. $NH_2$COPh-), 4-benzoylphenyl, dicyanoisopropylidenebis(4-phenyloxy) (i.e. —$OPhC(CN)_2PhO$—), 3-methylphenyl, methylenebis(4-phenyloxy) (i.e. —$OPhCH_2PhO$—), ethylphenyl, phenylethenyl, 3-formyl-2-thienyl, 2-hexyl-5-furanyl; hexamethylene-1,6-bis(4-phenyloxy) (i.e. —$OPh(CH_2)_6PhO$—); 4-hydroxymethylphenyl (i.e. 4-$HOCH_2$Ph-), 4-mercaptomethylphemyl (i.e. 4-$HSCH_2$Ph-), 4-methylthiophenyl (i.e. 4-$CH_3$SPh-), methoxyphenyl, methoxycarbonylphenyloxy (e.g. methyl salicyl), nitromethylphenyl (i.e. -$PhCH_2NO_2$), trimethylsilylphenyl, t-butyldimethylsilylphenyl, vinylphenyl, vinylidenebis(phenyl), and the like. The term "a $C_3$-$C_{10}$ aromatic radical" includes substituted aromatic radicals and unsubstituted aromatic radicals containing at least three but no more than 10 carbon atoms. The aromatic radical 1-imidazolyl ($C_3H_2N_2$—) represents a $C_3$ aromatic radical. The benzyl radical ($C_7H_8$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is an cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. Cycloaliphatic radicals may be "substituted" or "unsubstituted". A substituted cycloaliphatic radical is defined as a cycloaliphatic radical which comprises at least one substituent. A substituted cycloaliphatic radical may comprise as many substituents as there are positions available on the cycloaliphatic radical for substitution. Substituents which may be present on a cycloaliphatic radical include but are not limited to halogen atoms such as fluorine, chlorine, bromine, and iodine. Substituted cycloaliphatic radicals include trifluoromethylcyclohexyl, hexafluoroisopropylidenebis(4-cyclohexyloxy) (i.e. —O $C_6H_{10}C(CF_3)_2$ $C_6H_{10}$O—), chloromethylcyclohexyl; 3-trifluorovinyl-2-cyclopropyl; 3-trichloromethylcyclohexyl (i.e. 3-$CCl_3C_6H_{10}$—), bromopropylcyclohexyl (i.e. $BrCH_2CH_2CH_2$ $C_6H_{10}$—), and the like. For convenience, the term "unsubstituted cycloaliphatic radical" is defined herein to encompass a wide range of functional groups. Examples of unsubstituted cycloaliphatic radicals include 4-allyloxycyclohexyl, aminocyclohexyl (i.e. $H_2N\ C_6H_{10}$—), aminocarbonylcyclopenyl (i.e. $NH_2COC_5H_8$—), 4-acetyloxycyclohexyl, dicyanoisopropylidenebis(4-cyclohexyloxy) (i.e. —O $C_6H_{10}C(CN)_2\ C_6H_{10}O$—), 3-methylcyclohexyl, methylenebis(4-cyclohexyloxy) (i.e. —O $C_6H_{10}CH_2\ C_6H_{10}O$—), ethylcyclobutyl, cyclopropylethenyl, 3-formyl-2-terahydrofuranyl, 2-hexyl-5-tetrahydrofuranyl; hexamethylene-1,6-bis(4-cyclohexyloxy) (i.e. —O $C_6H_{10}\ (CH_2)_6\ C_6H_{10}O$—); 4-hydroxymethylcyclohexyl (i.e. $4-HOCH_2\ C_6H_{10}$—), 4-mercaptomethylcyclohexyl (i.e. $4-HSCH_2\ C_6H_{10}$—), 4-methylthiocyclohexyl (i.e. $4-CH_3S\ C_6H_{10}$—), 4-methoxycyclohexyl, 2-methoxycarbonylcyclohexyloxy ($2-CH_3OCO\ C_6H_{10}O$—), nitromethylcyclohexyl (i.e. $NO_2CH_2C_6H_{10}$—), trimethylsilylcyclohexyl, t-butyldimethylsilylcyclopentyl, 4-trimethoxysilylethylcyclohexyl (e.g. $(CH_3O)_3SiCH_2CH_2C_6H_{10}$—), vinylcyclohexenyl, vinylidenebis(cyclohexyl), and the like. The term "a $C_3$-$C_{10}$ cycloaliphatic radical" includes substituted cycloaliphatic radicals and unsubstituted cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

As used herein, the term "(meth)acrylate" refers collectively to acrylate and methacrylate; for example, the term "(meth)acrylate monomers" refers collectively to acrylate monomers and methacrylate monomers. The term "(meth)acryloyloxy" refers collectively to acryloyloxy and methacryloyloxy monomers and/or oligomers.

As noted, the present invention provides a curable formulation comprising (a) at least one multifunctional-acrylate having a functionality of at least two, (b) at least one mono-acrylate monomer, (c) at least one heteroatom-containing diacrylate, wherein the heteroatom is selected from the group consisting of sulfur and selenium, and (d) at least one curing agent.

The multifunctional acrylate can be any acrylate having a functionality of at least two. For the purposes of the present disclosure, the term "functionality" refers to an acrylate functional group. The multifunctional acrylate may be a single monomeric species, for example ethylene glycol diacrylate, but may further comprise one or more oligomeric components. Suitable multifunctional acrylates are illustrated by alkylene glycol di(meth)acrylates, aromatic bisphenol di(meth)acrylates, aliphatic diol di(meth)acrylates, aromatic bisphenol ethoxylate di(meth)acrylates, cycloaliphatic diol di(meth)acrylates, polycyclic diol di(meth)acrylates, aliphatic and aromatic polyol poly(meth) acrylates, aliphatic and aromatic alkylene ether polyol poly(meth)acrylates, aliphatic urethane di(meth)acrylates; and copolymers and blends comprising at least one of the foregoing multifunctional acrylates.

Specific examples of multifunctional acrylates include polyacrylates selected from the group consisting of bisphenol A di(meth)acrylate; ethylene glycol di(meth)acrylate; 1,4-butanediol di(meth)acrylate; 1,6-hexanediol di(meth) acrylate; 1,3-propylene glycol di(meth)acrylate; tetramethylene glycol di(meth)acrylate; 2-butyl-2-ethyl-1,3-propane diol di(meth)acrylate; neopentyl glycol di(meth)acrylate; alkoxylated 1,4-cyclohexanedimethanol di(meth)acrylate; pentaerythritol tetra(meth)acrylate; alkoxylated pentaerythritol tetra(meth)acrylate; glycerol tri(meth)acrylate; glycerol propoxylated tri(meth)acrylate; trimethylolpropane tri (meth)acrylate; tris(2-hydroxyethyl) isocyanurate triacrylate; polybutadiene diacrylate; polyisoprene diacrylate; 1,3-bis(acryloyloxyethoxy)isophorone diurethane; bis (acryloyloxyethoxy)toluene diurethane; and mixtures comprising at least one of the foregoing multifunctional acrylates. Other non-limiting examples of the multifunctional acrylates include 2,2-bis{4-(2-acryloyloxy ethyleneoxy)-(3,5-di bromophenyl)}propane; 2,2-bis{4-(omega-acryloyloxy polyethyleneoxy)-(3,5-di bromophenyl)} propane; 2,2-bis{4-(omega-(methacryloyloxy polyethyleneoxy)phenyl}propane; and 2,2-bis {4-(omega-(metha) acryloyloxy polypropyleneoxy)phenyl}propane.

In another embodiment, the at least one multifunctional acrylate having a functionality of at least two comprises structural units having a formula (I)

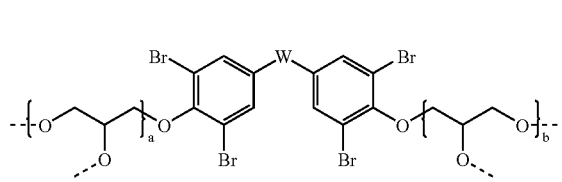

wherein W is a bond, an oxygen atom, a $C_1$-$C_{10}$ aliphatic radical, a $C_5$-$C_{20}$ cycloaliphatic radical, or a $C_3$-$C_{20}$ aromatic radical; and "a" and "b" are each independently greater than or equal to 1. In various embodiments, the dashed lines emanating from the oxygen atoms shown in formula (I) can terminate as various combinations comprising hydroxy groups and acryloyl groups.

In yet another embodiment, the multi-functional acrylate having a functionality of at least two comprises substances having a general formula (II)

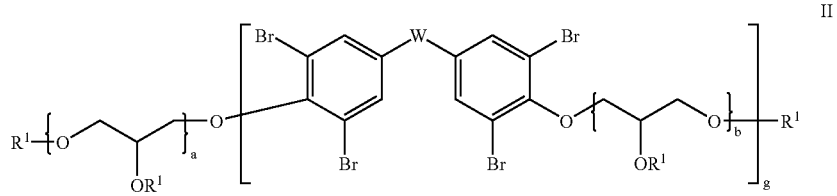

wherein W is a bond, an oxygen atom, a $C_1$-$C_{10}$ aliphatic radical, a $C_5$-$C_{20}$ cycloaliphatic radical, or a $C_3$-$C_{20}$ aromatic radical; and "a", "b", and "g" are each independently greater than or equal to 1; and each $R^1$ independently at each occurrence is a hydrogen atom or an acryloyl group having a formula (III),

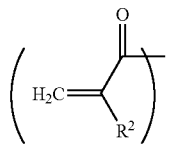

III wherein $R^2$ is independently at each occurrence a hydrogen atom, a halogen atom, a $C_1$-$C_{10}$ aliphatic radical, a $C_5$-$C_{10}$ cycloaliphatic radical, or a $C_3$-$C_{10}$ aromatic radical.

Diacrylates disclosed herein, including diacrylates represented by formula I or formula (II) are considered "multifunctional acrylates having a functionality of at least two". In some instances the multifunctional acrylates having a functionality of at least two comprise a significant amount of oligomeric components. In one embodiment, the multifunctional acrylate comprises oligomeric components which constitute from about 25 to about 75 weight percent of the multifunctional acrylate. A non-limiting example of an oligomeric multifunctional acrylate is shown in formula (IV)

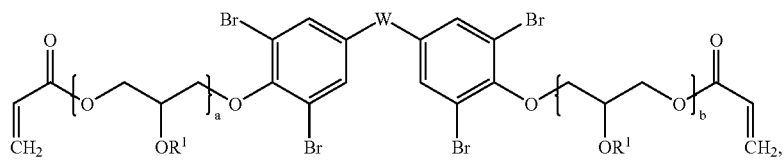

IV wherein W, "a", and "b" have the same meaning in formula (I),and $R^1$ is has the same meaning as in formula (II)

Another example of a multifunctional acrylate having a functionality of at least two is a di(meth)acrylate which is the reaction product from the reaction of tetrabromobisphenol diglycidyl ether with acrylic acid (See srtucture V wherein $R^1$ is H). A non-limiting example of a di(meth) acrylate derived from tetrabromobisphenol diglycidyl ether has a formula (V),

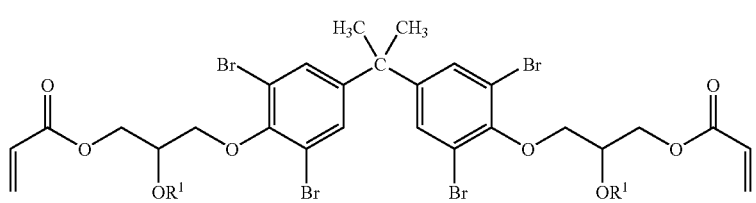

V wherein $R^1$ is as defined in formula (II). A specific example of a multifunctional acrylate which can be used for preparing the curable formulations and cured compositions of the invention is one in which both the $R^1$ groups in formula (V) are hydrogen atoms.

In one embodiment, multifunctional acrylates can be prepared, for example, by reacting a tetrabromobisphenol having structure (VI),

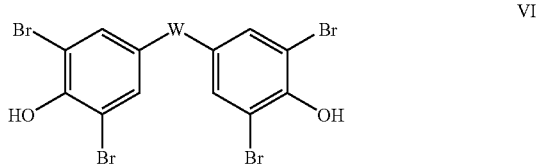

VI wherein "W" is defined as in structure I; with glycidyl alcohol to produce an intermediate oligomeric intermediate product having a structure (VII),

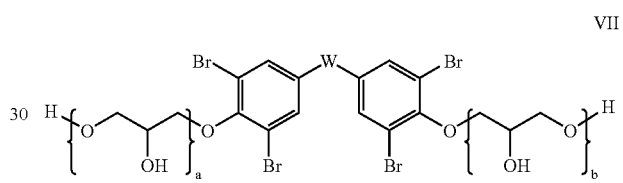

VII wherein W, "a" and "b" are defined as in formula I; followed by reaction of the intermediate product (VII) with a suitable (meth)acrylic anhydride or (meth)acryloyl chloride to produce a multifunctional acrylate comprising structure II, said multifunctional acrylate having a functionality of at least two.

In another embodiment, the multifunctional acrylate comprises an (ethyleneoxy)(meth)acrylate represented by structure (VIII),

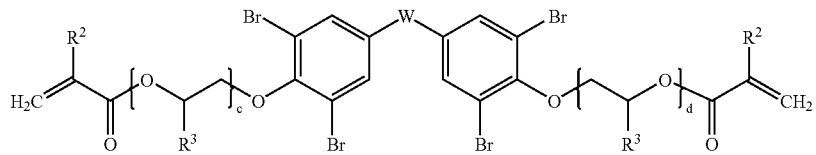

VIII wherein $R^2$ is independently at each occurrence a hydrogen atom, a halogen atom, a $C_1$-$C_{10}$ aliphatic radical, a $C_5$-$C_{10}$ cycloaliphatic radical, or a $C_3$-$C_{10}$ aromatic radical, "W" is defined as in structure I; $R^3$ is independently at each occurrence a hydrogen atom, a $C_1$-$C_{10}$ aliphatic radical, a $C_3$-$C_{10}$ cycloaliphatic radical, or a $C_6$-$C_{10}$ aromatic radical; and "c", and "d" are each independently greater than or equal to 1.

Multifunctional acrylates comprising structure VIII can be prepared, for example, by reaction of a tetrabromobisphenol compound of formula VI with an ethylene oxide derivative of structure (IX)

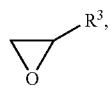

IX wherein $R^3$ is independently at each occurrence a hydrogen atom, a $C_1$-$C_{10}$ aliphatic radical, a $C_3$-$C_{10}$ cycloaliphatic radical, or a $C_6$-$C_{10}$ aromatic radical; followed by reaction of the resulting intermediate with a suitable (meth)acrylic anhydride or a (meth)acryloyl chloride. When two or more epoxides of formula IX are employed, the resulting multifunctional acrylate of formula (VIII) will have two or more types of $R^3$ groups. Non-limiting examples of the multifunctional acrylate of formula (VIII) include 2,2-bis{4-(omega-(metha)acryloyloxy polyethyleneoxy)-(3,5-di bromophenyl)}propane; 2,2-bis{4-(omega-)acryloyloxy ethyleneoxy)-(3,5-di bromophenyl)}propane; and the like.

Further examples of multifunctional (meth)acrylates include 2,2-bis(4-(2-(meth)acryloxyethoxy)phenyl)propane; 2,2-bis((4-(meth)acryloxy)phenyl)propane; acrylic acid 3-(4-{1-[4-(3-acryloyloxy-2-hydroxy-propoxy)-3,5,-dibromophenyl]-1-methylethyl}-2,6-dibromo-phenoxy)-2-hydroxy-propyl ester; acrylic acid 3-[4-(1-{4-[3-(4-{1-[4-(3-acryloyloxy-2-hydroxy-propoxy)-3,5-dibromophenyl]-1-methyl-ethyl}-2,6-dibromo-phenoxy)-2-hydroxy-propoxy]-3,5-dibromophenyl}-1-methylethyl)-2,6-dibromo-phenoxy]-2-hydroxy-propyl ester; and the like, and combinations thereof. Another suitable multifunctional acrylate is derived from the reaction product of tetrabrominated bisphenol-A diglycidylether with acrylic acid, RDX 51027, available from UCB Chemicals.

The curable formulations of the present invention comprise at least one mono-acrylate. There is no particular limitation on the mono-acrylate employed and the role of the mono-acrylate is to provide control of the viscosity of the curable formulation and the glass transition temperature of cured polymer compositions ultimately prepared from the curable formulations. Any type of a mono acrylate, either by itself, or in combination with one or more of other mono-acrylates can be used. Mono-acrylates may comprise one or more aliphatic, cycloaliphatic, or aromatic radicals. Mono-acrylates comprising aromatic radicals are particularly suitable as components of the curable formulations of the present invention. The mono-acrylates may comprise a wide variety of functional groups in addition to the acrylate functionality, and may comprise one or more heteroatoms, for example, nitrogen, oxygen, sulfur and selenium.

Suitable mono-acrylate monomers include aliphatic mono (meth)acrylates, aryl mono (meth)acrylates, cycloaliphatic mono (meth)acrylates, alkylene glycol alkyl ether mono (meth)acrylates, alkylene glycol mono (meth)acrylates, alkylene glycol alkyl ether mono(meth)acrylates, alkylene glycol aryl ether mono (meth)acrylates, glycol-based and bisphenol-based mono (meth)acrylates, and glycidyl-substituted mono (meth)acrylates.

Non-limiting examples of mono-acrylates include those selected from the group consisting of methyl (meth)acrylate; ethyl (meth)acrylate; butyl (meth)acrylate; 2-ethylhexyl (meth)acrylate; octyl (meth)acrylate; isodecyl (meth)acrylate; dodecyl (meth)acrylate; octadecyl (meth)acrylate; cyclohexyl (meth)acrylate; 4-methylcyclohexyl (meth)acrylate; isobornyl (meth)acrylate; adamantyl (meth)acrylate; phenyl (meth)acrylate; benzyl (meth)acrylate; 1-naphthyl (meth)acrylate; 4-fluorophenyl (meth)acrylate; 4-chlorophenyl (meth)acrylate; 4-bromophenyl (meth)acrylate; 2,4,6-tribromophenyl (meth)acrylate; 4-methoxyphenyl (meth)acrylate; 4-cyanophenyl (meth)acrylate; 4-phenylphenyl (meth)acrylate; 2-bromobenzyl (meth)acrylate; 2-fluoroethyl (meth)acrylate; 2-chloroethyl (meth)acrylate; 2-bromoethyl (meth)acrylate; trichloromethyl (meth)acrylate; 2-hydroxyethyl (meth)acrylate; 2-hydroxypropyl (meth)acrylate; 2-(2-ethoxyethoxy)ethyl acrylate; propylene glycol 4-nonylphenylether acrylate; glycidyl (meth)acrylate; N-butylaminoethyl (meth)acrylate; alpha-fluoro (meth)acrylate; alpha-cyano (meth)acrylate; 2,2,2-trifluoroethyl methacrylate; pentafluoropropyl methacrylate; 1,3-bis(thiophenyl)propan-2-yl acrylate; 1,3-bis(phenoxy)propan-2-yl (meth)acrylate; 1,3-bis(2,4,6-tribromophenoxy)propan-2-yl (meth)acrylate; 1,3-bis(2-mercaptobenzothiazoyl)propan-2-yl (meth)acrylate; 2-(4-chlorophenoxy)-1-[(phenylthio)methyl]ethyl (meth)acrylate; 4-bromobenzyl (meth)acrylate; tribromobenzyl (meth)acrylate; pentabromobenzyl (meth)acrylate; and 2-phenylthioethyl acrylate; and mixtures comprising at least one of the foregoing mono-acrylates.

In one embodiment of the present invention, the mono-acrylate has structure (X)

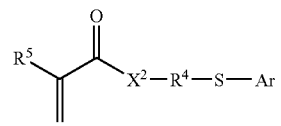

X wherein $X^2$ is O or S; $R^4$ is a divalent $C_1$-$C_{10}$ aliphatic radical, a divalent $C_3$-$C_{10}$ cycloaliphatic radical, or a divalent $C_6$-$C_{10}$ aromatic radical, $R^5$ is a hydrogen atom, a halogen atom, a $C_1$-$C_{10}$ aliphatic radical, a $C_3$-$C_{10}$ cycloaliphatic radical, or a $C_3$-$C_{10}$ aromatic radical, Ar is a $C_3$-$C_{20}$ aromatic radical.

In one embodiment, the mono-acrylate comprises at least one member selected from the group consisting of 2-(2-benzothiazolyl)thioethyl acrylates having structure (XI),

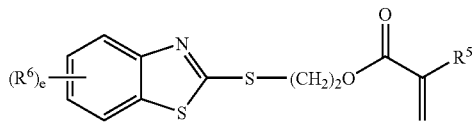

XI and 2-(phenylthioethyl)acrylates having structure (XII),

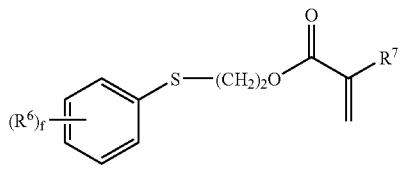

XII wherein in structures XI and XII, $R^5$ and $R^7$ are independently a hydrogen atom, a halogen atom, a $C_1$-$C_{10}$ aliphatic radical, a $C_3$-$C_{10}$ cycloaliphatic radical, or a $C_3$-$C_{10}$ aromatic radical; $R^6$ is independently at each occurrence a hydrogen atom, halogen atom, a $C_1$-$C_{10}$ aliphatic radical, a $C_3$-$C_{10}$ cycloaliphatic radical, or a $C_3$-$C_{10}$ aromatic radical; "e" is an integer including 0 from 0-4, and "f" is an integer including 0 from 0-5.

The curable formulations of the present invention comprise at least one heteroatom-containing diacrylate, which serves to increase the refractive index of cured compositions prepared from the curable formulations. Preferably, the heteroatom-containing diacrylate has a relatively low viscosity (i.e. a viscosity of less than or equal to about 500 centipoises at 25° C. Typically, suitable heteroatom-containing diacrylates exhibit an index of refraction of greater than about 1.5, preferably greater than about 1.55, still more preferably greater than about 1.60, and yet still more preferably greater than about 1.65. Thus, heteroatom-containing diacrylates exhibit an index of refraction in a range of from about 1.50 to about 1.65, preferably from about 1.55 to about 1.65, and still more preferably from about 1.60 to about 1.65.

The heteroatom-containing diacrylate also functions as a reactive diluent in the curable formulations, thereby enhancing the processability of the curable formulations.

As defined herein, the term "heteroatom-containing diacrylate" does not include dithioacrylates such as bis(methacryloylthiophenyl)sulfide (CAS No. 137052-23-4) abbreviated herein as "MPSMA".

Typically, the heteroatom-containing diacrylate is a compound incorporating two substituted or unsubstituted acryloyloxy groups, said compound having structure (XIII),

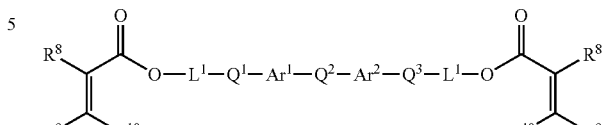

XIII wherein $R^8$, $R^9$, and $R^{10}$ are independently at each occurrence a hydrogen atom, a halogen atom, a $C_1$-$C_{10}$ aliphatic radical, a $C_3$-$C_{10}$ cycloaliphatic radical, or a $C_3$-$C_{10}$ aromatic radical; $L^1$ and $L^2$ are independently at each occurrence a divalent $C_1$-$C_{10}$ aliphatic radical, a divalent $C_3$-$C_{10}$ cycloaliphatic radical, or a divalent $C_3$-$C_{10}$ aromatic radical; $Q^1$, $Q^2$, and $Q^3$ are independently at each occurrence a bond, an oxygen atom, a carbonyl group, a thiocarbonyl group, a carbonyloxy group, an oxycarbonyl group, a sulfur atom, a selenium atom, a disulfide group, a diselenide group, a selenosulfide group, a sulfoxide group, a sulfone group, a selenoxide group or a selenone group, wherein at least one of $Q^1$, $Q^2$, and $Q^3$ comprises a sulfur atom or a selenium atom; and $Ar^1$ and $Ar^2$ are independently $C_3$-$C_{10}$ divalent aromatic radicals.

In one embodiment, the heteroatom-containing diacrylate comprises at least one diacrylate selected from the group consisting of diacrylates (XIV), (XV), and (XVI)

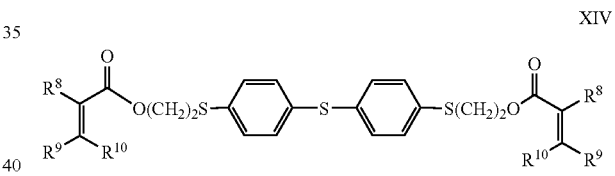

XIV

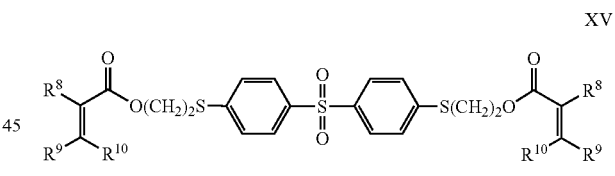

XV

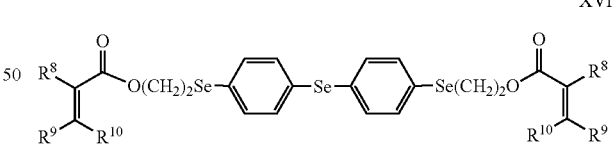

XVI wherein $R^8$, $R^9$ and $R^{10}$ are defined as in structure XIII. Suitable heteroatom-containing diacrylates are exemplified by compounds XVII, XVIII, and XIX.

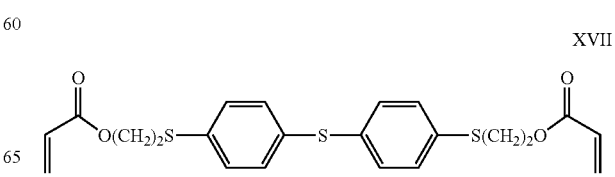

XVII

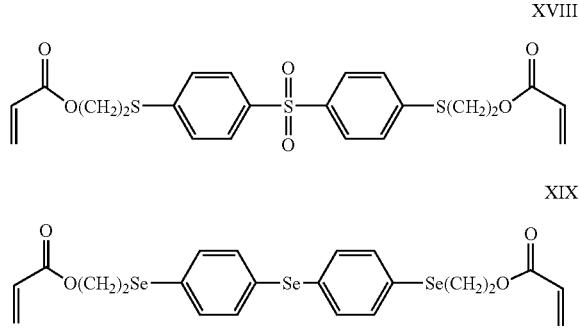

Compound XVII, also referred to as phenylenesulfidethioethyl diacrylate is considered particularly suitable since it has a high index of refraction, 1.62, and exhibits a relatively low viscosity of about 500 centipoises at 25° C.

The curable formulations of the present invention comprise a curing agent. The curing agent is used to transform the curable formulation to a cured composition in a curing process. Processes for curing acrylate compositions are known to those skilled in the art. The curable compositions of the present invention represent a novel genus of acrylate compositions. The curing process comprises polymerization of the acrylate groups of the multifunctional acrylate, the mono-acrylate monomer, and the heteroatom-containing diacrylate, and may further comprise post-polymerization curing. Non-limiting examples of post polymerization curing processes include crosslinking polymerization of reactive groups, such as epoxy groups or olefinic groups. The curing agent is selected from the group consisting of photosensitive curing agents and thermally sensitive curing agents. Photosensitive curing agents and thermally sensitive curing agents are known to those skilled in the art. Thermally sensitive curing agents are sometimes also called "thermal curing agents". A variety of curing agents are commercially available from vendors, such as for example, Aldrich Chemical Company. The IRGACURE and DAROCUR series of photosensitive curing agents are available from Ciba Specialty Chemicals Corporation. Typically, the curing agent is present in the curable formulation in an amount corresponding to from about 0.001 weight percent to about 5 weight percent, relative to the total weight of the curable composition.

Typical photosensitive curing agents include Type I and Type II ultraviolet (UV) photoinitiators. Type I UV photoinitiators are exemplified by benzoin ethers, benzil ketals, alpha-dialkoxyacetophenones, alpha-hydroxyalkylphenones, alpha-aminoalkylphenones, and acylphosphine oxides. Type II UV photoinitiators include combinations of benzophenones and amines, and thioxanthones and amines. Visible light photoinitiators, such as for example titanocenes, may also be employed.

Non-limiting examples of photosensitive curing agents include benzoin ethers; benzil ketals; alpha-dialkoxyacetophenones; alpha-hydroxyalkylphenones; alpha-aminoalkylphenones (example, acyl phosphine oxides, triarylsulfonium hexafluoroantimonate salts; triarylsulfonium hexafluorophosphates; 1-hydroxycyclohexyl phenyl ketone; 2,2-dimethoxy-1,2-diphenylethan-1-one; methyl phenyl glyoxalate; alpha-hydroxyacetophenones; benzophenones; isopropyl thioxanthone; 2,4,6-trimethylbenzoyl diphenylphosphine; 2-benzyl-2-N,N-dimethylamino-1-(4-morpholinophenyl)butanone (commercially known as IRGACURE® 369); and 2-methyl-1[4-(methylthio)phenyl]-2-morpholinopropan-1-one.

Photoinitiated curing agents are further illustrated by IRGACURE 184 (comprising 1-hydroxycyclohexyl phenyl ketone); IRGACURE 907 (comprising 2-methyl-1-[4-(methylthio)phenyl]-2-morpholino propan-1-one); IRGACURE 369 (comprising 2-benzyl-2-N,N-dimethylamino-1-(4-morpholinophenyl)-1-butanone); IRGACURE 500 (a combination of 1-hydroxycyclohexyl phenyl ketone and benzophenone); IRGACURE 651 (comprising 2,2-dimethoxy-2-phenyl acetophenone); IRGACURE 1700 (a combination of bis(2,6-dimethoxybenzoyl-2,4-4-trimethyl pentyl) phosphine oxide; and 2-hydroxy-2-methyl-1-phenyl-1-propan-1-one), IRGACURE 819; DAROCUR 1173 (2-hydroxy-2-methyl-1-phenyl-1-propane-1-one); DAROCUR 4265 (a combination of 2,4,6-trimethylbenzoyldiphenyl-phosphine oxide; and 2-hydroxy 2-methyl-1-phenyl-propan-1-one). Photoinitiators are available additionally under the CYRACURE tradename available the DOW Chemical Company. CYRACURE UVI-6974 is a mixed triaryl sulfonium hexafluoroantimonate salt. CYRACURE UVI-6990 is a mixed triaryl sulfonium hexafluorophosphate salts. Visible light (blue light) photoinitiators are exemplified by d1-camphorquinone.

Additional photosensitive curing agents are available from SARTOMER, Incorporated, Exton, Pa. under the tradenames ESACURE and SARCAT. Examples include ESACURE KB1 (i.e. benzil dimethyl ketal); ESACURE EB3 (a mixture of benzoin and butyl ethers); ESACURE TZT (a trimethylbenzophenone blend); ESACURE KIP100F (i.e. an alpha-hydroxy ketone); ESACURE KIP150 (a polymeric hydroxy ketone); ESACURE KT37 (a blend of ESACURE TZT and ESACURE KIP150); ESACURE KT046 (a blend comprising triphenyl phosphine oxide; ESACURE KIP150 and ESACURE TZT); ESACURE X33 (a blend of 2- and 4-isopropylthioxanthone; ethyl 4-(dimethyl amino)benzoate and ESACURE TZT); SARCAT CD 1010 (a triaryl sulfonium hexafluoroantimonate (50% in propylene carbonate)); SARCAT DC 1011 (a triaryl sulfonium hexafluorophosphate (50% n-propylene carbonate)); SARCAT DC 1012 (a diaryl iodonium hexafluoroantimonate); and SARCAT K185 (a triaryl sulfonium hexafluorophosphate (50% in propylene carbonate)). Mixtures comprising one or more of the photosensitive curing agents described above may also be used.

Thermal curing agents are widely available commercially. For example, thermal curing agents are available commercially from under the tradenames LUPERSOL (available from Atofina Inc.), DELANOX-F, ALPEROX-F, LUCIDOL, LUPERCO, and LUPEROX. Suitable thermal curing agents include LUPERSOL DDM-9 (a mixture of peroxides and hydroperoxides), LUPERSOL DDM-30 (a mixture of peroxides and hydroperoxides), LUPERSOL DELTA-X-9 (a mixture of peroxides and hydroperoxides), LUPERSOL DHD-9 (a mixture of peroxides and hydroperoxides), LUPERSOL DFR (a mixture of peroxides and hydroperoxides), LUPERSOL DSW-9 (a mixture of peroxides and hydroperoxides), LUPERSOL 224 (comprising 2,4-pentanedione peroxide), LUPERSOL 221 (comprising di(n-propyl)peroxydicarbonate), LUPERSOL 225 (comprising di(sec-butyl)peroxydicarbonate), LUPERSOL 225-M75 (comprising di(sec-butyl)peroxydicarbonate), LUPERSOL 225-M60 (comprising di(sec-butyl)peroxydicarbonate), LUPERSOL 223 (comprising di(2-ethylhexyl)peroxydicarbonate), LUPERSOL 223-M75 (comprising di(2-ethylhexyl)peroxydicarbonate), LUPERSOL 223-M40 (comprising di(2-ethylhexyl)peroxydicarbonate), LUPERSOL 219-M60 (comprising diisononanoyl peroxide), LUCIDOL 98 (comprising benzoyl peroxide), LUCIDOL 78 (comprising benzoyl peroxide), LUCIDOL 70 (comprising benzoyl peroxide), LUPERCO AFR-400 (comprising benzoyl peroxide), LUPERCO AFR-250 (comprising benzoyl peroxide), LUPERCO AFR-500 (comprising benzoyl peroxide), LUPERCO ANS (comprising benzoyl peroxide), LUPERCO ANS-P (comprising benzoyl peroxide), LUPERCO ATC (benzoyl peroxide), "LUPERCO" AST (benzoyl peroxide), "LUPERCO" AA (comprising benzoyl peroxide), LUPERCO ACP (comprising benzoyl peroxide), LUPERSOL 188M75 (comprising alpha-cumylperoxy neodecanoate), LUPERSOL 688T50 (comprising 1,1-dimethyl-3-hydroxy-butyl peroxyneoheptanoate), LUPERSOL 688M50 (comprising 1,1-dimethyl-3-hydroxy-butyl peroxyneoheptanoate), LUPERSOL 288M75 (comprising alpha cumyl peroxyneoheptanoate), LUPERSOL 546M75 (comprising t-amylperoxy neodecanoate), LUPERSOL 10 (comprising t-butylperoxy neodecanoate), LUPERSOL 10M75 (comprising t-butylperoxy neodecanoate), LUPERSOL 554M50 (comprising t-amylperoxypivalate), LUPERSOL 554M75 (comprising t-amylperoxypivalate), LUPERSOL 11 (comprising t-butylperoxypivalate), LUPERSOL 665T50 (comprising 1-1-dimethyl-3-hydroxy-butylperoxy-2-ethyl-hexanoate), LUPERSOL 665M50 (comprising 1-1-dimethyl-3-hydroxy-butylperoxy-2-ethylhexanoate), LUPERSOL 256 (comprising 2,5-dimethyl-2,5-di(2-ethylhexanoyl peroxy)hexane), LUPERSOL 575 (comprising t-amylperoxy-2-ethyl-hexanoate), LUPERSOL 575P75 (comprising t-amylperoxy-2-ethyl-hexanoate), LUPERSOL 575M75 (comprising t-amylperoxy-2-ethyl-hexanoate, t-butyl peroctoate (t-butylperoxy-2-ethylhexanoate), LUPERSOL PMS (comprising t-butylperoxy-2-ethylhexanoate), LUPERSOL PDO (comprising t-butylperoxy-2-ethylhexanoate), LUPERSOL 80 (comprising t-butyl peroxyisobutyrate), LUPERSOL PMA (comprising t-butyl peroxymaleic acid), LUPERCO PMA-25 (comprising t-butyl peroxymaleic acid), LUPERSOL 70 (comprising t-butyl peroxyacetate), LUPERSOL 75-M (comprising t-butyl peroxyacetate), LUPERSOL 76-M (comprising t-butyl peroxyacetate), LUPERSOL 555M60 (comprising t-amyl peroxy-acetate), LUPERSOL KDB (comprising di-t-butyl diperoxyphthalate), LUPERSOL TBIC-M75 (comprising OO-t-butyl-O-isopropyl monoperoxycarbonate), LUPEROX 118 (comprising 2,5-dimethyl-2,5-di(benzoylperoxy)hexane), LUPERSOL TBEC (comprising OO-t-butyl-O-(2-ethylhexyl)monoperoxycarbonate), LUPERSOL TAEC (comprising OO-t-amyl-O-(2-ethylhexyl)monoperoxycarbonate), LUPEROX 500R (comprising dicumyl peroxide), LUPEROX 500T (comprising dicumyl peroxide), LUPERCO 500-40C (comprising dicumyl peroxide), LUPERCO 500-40E (comprising dicumyl peroxide), LUPERCO 500-SRK (comprising dicumyl peroxide), LUPERSOL 101 (comprising 2,5-dimethyl-2,5-di-(t-butylperoxy)hexane), LUPERSOL 101-XL (comprising 2,5-dimethyl-2,5-di-(t-butylperoxy) hexane), LUPERCO 101-P20 (comprising 2,5-dimethyl-2,5-di-(t-butylperoxy)hexane), LUPERSOL 801 (comprising t-butyl cumyl peroxide), LUPERCO 801-XL (comprising t-butyl cumyl peroxide), LUPEROX 802 (comprising alpha, alpha-bis(t-butylperoxy) diisopropylbenzene), LUPERCO 802-40KE (comprising alpha, alpha-bis(t-butylperoxy)diisopropylbenzene), LUPERSOL 130 (comprising 2,5-dimethyl-2,5-di-(t-butylperoxy)hexyne-3), LUPERCO 130-XL (2,5-dimethyl-2,5-di-(t-butylperoxy)-3-hexyne), LUPEROX 2,5-2,5 (comprising 2,5-dihydro-peroxy-2,5-dimethylhexane), LUPERSOL 230 (comprising n-butyl-4,4-di-(t-butylperoxy)valerate), LUPERCO 230-XL (comprising n-butyl-4,4-di-(t-butylperoxy)valerate), LUPERSOL 231 (comprising 1,1-di(t-butylperoxy)-3,3,5-trimethyl cyclohexane), LUPERCO 231-XL (comprising 1,1-di(t-butylperoxy) 3,3,5-trimethyl cyclohexane), LUPERSOL 231-P75 (comprising 1,1-di(t-butylperoxy) 3,3,5-trimethyl cyclohexane), LUPERCO 231-SRL (comprising 1,1-di(t-butylperoxy)-3,3,5-trimethyl cyclohexane), LUPERSOL 331-80B (comprising 1,1-di(t-butylperoxy)cyclohexane), LUPERCO 331-XL (comprising 1,1-di (t-butylperoxy)cyclohexane), LUPERSOL 531-80B (comprising 1,1-di(t-amylperoxy)cyclohexane), LUPERSOL 531-80M (comprising 1,1-di(t-amylperoxy)cyclohexane), LUPERSOL 220-D50 (comprising 2,2-di(t-butylperoxy)butane), LUPERSOL 233-M75 (comprising ethyl-3,3-di(t-butylperoxy)butyrate), LUPERCO 233-XL (comprising ethyl-3,3-di(t-butylperoxy)butyrate), LUPERSOL P-31 (comprising 2,2-di-(t-amylperoxy)propane), LUPERSOL P-33 (comprising 2,2-di-(t-amylperoxy) propane), and LUPERSOL 553-M75 (comprising ethyl 3,3-di(t-amylperoxy)butyrate). Mixtures comprising one or more of these initiators may also be used.

Other thermally-activated latent curing compositions include those available commercially from DuPont under the VAZO tradename, such as VAZO 64 (2,2'-azobisisobutyronitrile), VAZO 67 (2,2'-azobis(2-methylbutanenitrile)), and VAZO 88 (1,1'-azobis(cyclohexanecarbonitrile)).

The curable compositions provided by the present invention undergo curing and crosslinking at acceptable reaction rates to afford cured compositions that exhibit high optical clarity and excellent ductility, dimensional stability, and mechanical properties (mandrel bend, adhesion, and flatness). The cured compositions in turn are valuable for producing optical articles and articles used for light management.

In one embodiment of the present invention, the cured compositions are useful for producing display films, more particularly, brightness enhanced films, that are in turn valuable for producing various types of display devices and multilayer optical articles containing one or more microreplicated layers of the films, such as for example, backlight-illuminated brightness enhancement display devices. In an embodiment, the optical article comprising the cured composition has a brightness of from about 840 to about 860 candela per meter square.

In another embodiment, the optical article is a "flat" film made from the curable composition of the present invention, and having a percent haze value, as measured in accordance with ASTM D1003 test method of from about 0.7 to about 1.3 percent, and in another embodiment of from 0.7 to about 1 percent. A flat film is defined as a film which lacks microstructure on its surface.

The cured compositions typically have a glass transition temperature ($T_g$) of less than 100° C. In one embodiment the cured compositions have a $T_g$ of from about 40° C. to about 99° C. In yet another embodiment the cured compositions have a $T_g$ of from about 40° C. to about 85° C. In still yet another embodiment the cured compositions have a $T_g$ of from about 50° C. to about 75° C.

Non-limiting, general examples of brightness enhanced display devices include transmissive displays, partially transmissive displays, single order or multiple order reflective displays, transflective displays, or forward scattering displays. In some embodiments, the films produced from the cured compositions may also be used in brightness enhanced display films, display devices, or optical articles in which a combination of any two or more of the display devices mentioned hereinabove may be operative.

Films produced from the cured compositions of the present invention may also be used for producing passive devices to enhance brightness, such as reflective polarizers, active brightness enhancement displays, such as for a cold cathode fluorescent lamp, and the like. Further, the cured compositions can also be used in a variety of other applications, for example, as substrates that are used in fresnel lenses, holographic substrates, or in combination with conventional lenses, prisms or mirrors, display devices for automatic teller machines, projection displays, illuminated signs, traffic signals, and the like.

EXAMPLES

The following examples are set forth to provide those of ordinary skill in the art with a detailed description of how the curable compositions claimed herein and methods for their use are evaluated, and are not intended to limit the scope of what the inventors regard as their invention. Unless indicated otherwise, parts are by weight, temperature is in ° C.

All reagents were purchased from Aldrich and used without further purification. All products were identified by $^1$H-NMR spectroscopy using a Bruker Avance 400 MHz NMR spectrometer. Phenylenesulfidethioethyl diacrylate (abbreviated as "TSDEA") was prepared as described below.

Preparation of bis[2-(hydroxyethyl)thiophenyl]sulfide [TSDE]:

To a one-liter round-bottomed flask equipped with a mechanical stirring, a water-jacketed condenser and nitrogen sparge was added 300 mL of toluene. The flask was purged well with nitrogen and 4,4'-thiobisbenzenethiol (75 g, 0.30 mol), ethylene carbonate (54 g, 0.614 mol) and potassium carbonate (1.0 g, $7.25 \times 10^{-3}$ mol) were added. Upon completion of the addition the reaction mixture was brought to 80° C. until most of the foaming subsided, about 1.5 hours, then brought to reflux. The reaction mixture was refluxed for 3.5 hours. The heat was turned off and the reaction mixture was allowed to cool and a white powder with some silver specks precipitated from solution. A $^1$H-NMR of the powder revealed complete reaction. The product was collected by vacuum filtration and dissolved in hot toluene with activated charcoal. The solution was filtered hot through silica gel that removed dark specks and the liquor was left to cool. A white powder crystallized from the solution and was collected by vacuum filtration. The pure product was dried in a vacuum oven overnight to remove residual toluene.

Preparation of bis[2-(acryloyloxyethyl)thiophenyl]sulfide [TSDEA]

To a 2-liter flask equipped with a magnetic stirrer, an addition funnel, a water-jacketed condenser and nitrogen sparge was added 1.5 liter of dichloromethane. Triethylamine (100 mL, 0.664 mole) and TSDE (60 g, 0.166 mole) were added to the dichloromethane. Into the addition funnel was added acryloyl chloride (50 mL, 0.664 mole). The acryloyl chloride was slowly added the flask to keep the exotherm under control. Once the addition was complete the reaction was brought to reflux for 15 minutes and then the heat was turned off. The reaction mixture was stirred overnight. A $^1$H-NMR revealed incomplete reaction of the alcohol. Additional aliquots of triethylamine and acryloyl chloride were added until the complete conversion of alcohol was achieved. The reaction mixture was diluted with diethyl ether to precipitate the amine hydrochloride salt and was filtered through a course-fritted funnel, the salts being washed with diethyl ether. The clear yellow solution was washed with dilute aqueous HCl three times to remove any residual amine. An additional three washes with saturated sodium bicarbonate and then four washes with deionized water returned the pH to between 6 and 8. The organic layer was dried over $MgSO_4$ and the solvents were removed by rotary evaporation. The residue was very hazy. Dissolving the residue in hot ethanol and allowing the solution to separate on cooling accomplished removal of the haze. The residual ethanol was removed by rotary evaporation after the addition 20 mg of hydroquinone monomethyl ether (MEHQ) to yield a substantially colorless liquid.

Bis(methacryloylthiophenyl)sulfide (abbreviated as "MPSMA") was purchased from Sumitomo Seika Chemicals. Brominated epoxy acrylate RDX51027 was purchased from Surface Specialities, Inc. The curing agent, IRGACURE® 819 was purchased from Ciba Specialities, Inc. 2-(Phenylthio)ethyl acrylate (abbreviated as "PTEA") was purchased from BiMax Company.

The curable formulations were prepared by blending all the components in the amounts shown in Table 1. The weight percent values are with respect to the total weight of all the components forming the curable formulations. The mixture of components was heated and stirred to give a homogeneous curable formulation.

As used in the Examples, the term "coated film" is meant to indicate a two-layered film consisting of the curable formulation and the film substrate. The term "cured flat film" is meant to indicate a film that results from curing the coated film. Cured flat films that did not have microstructures were prepared according to the following procedure.

Coated cured flat films having a 7 to 20 micrometer thick cured composition layer atop a 0.005 inch (0.127 centimeter) thick polycarbonate film substrate were prepared using a custom-made laminating unit and Fusion EPIC 6000UV curing system. The laminating unit consisted of two rubber rolls—a bottom variable speed drive roll and a pneumatically driven top nip roll. This system was used to press together laminate stacks that were passed between the rolls. The coated flat films were prepared by transferring approximately 0.5 milliliter of the curable formulation to a highly polished, flat, chrome-plated 5-inch by 7-inch (12.7 centimeter by 17.8 centimeter) steel plate in a continuous line at the front or leading edge of the plate. A piece of the film substrate was then placed over the curable composition, and the resulting stack was sent through the laminating unit to press and distribute the curable composition uniformly between the chrome-plate and film substrate. With higher viscosity formulations, higher pressures and lower speeds were used, and the chrome-plate was heated to obtain the desired thickness. Photo-polymerization of the curable formulation within the stack was accomplished by passing the stack under a 600-watt V-bulb at a speed of 10 feet per minute (0.051 meters per second) using high power and a focal length of 2.1 inches (5.3 centimeters) for curing through the film substrate top layer. The coated cured flat film was then peeled off of the chrome-plate and used for measuring haze, percent transmission, color, yellowness index, and adhesion.

Coated cured microstructured films for measuring luminance or brightness were made using a continuous coater in which a bead of liquid coating is contacted with the substrate at the nip of a casting roll which contains the tool possessing the negative of the microstructure desired to be replicated and a rubber roll. After exiting the nip, the coated film (still in contact with the microstructured tool) was exposed to ultraviolet light to cure, resulting in a prism film. The prism film (comprising the base film and the cured composition) thus formed was subsequently stripped from the microstructured tool. The prism film and the geometry of the prisms are described in co-pending U.S. patent application, Ser. No. 10/065,981, entitled, "Brightness Enhancement Film With Improved View Angle" filed Dec. 6, 2002, which is incorporated by reference herein in its entirety.

Films of the cured composition (having no base film) for dynamic mechanical analysis were prepared by using the same method as that described for flat films with the exception that the base film substrate was polycarbonate film masked by a polyethylene (PE) film. The PE masking film was used to protect the polycarbonate film from damage. Thus, the liquid curable formulation was applied as a coating on the PE side of the masked polycarbonate film situated on the chrome plate. After curing, a free-standing film of the cured composition was obtained by peeling it away from the polyethylene masking film.

The refractive index (RI) of the liquid materials employed was measured using a Bausch and Lomb Abbe-3L refractometer. The RI of cured, flat films was measured with a Metricon Corporation prism coupler Model 2010 using the thick film (bulk material) setting. The curable composition was coated onto a polycarbonate substrate as a smooth layer and then cured. The cured, smooth coating was brought into direct contact with the prism without any index matching fluid. The refractive index was calculated based on the critical angle of the prism/coating interface.

Viscosity was measured at 25° C. on 0.5 milliliters of the liquid curable composition using a Brookfield LVDV-II Cone/Plate Viscometer equipped with a CPE40 or CPE51 spindle attachment. The torque range used was within 15-90 percent of the maximum rated value for the equipment for the specific cone attachment. Viscosity values were measured in centipoise (cP).

Glass transition temperatures ($T_g$) of the cured compositions (free-standing films, i.e. no base film) were measured by dynamic mechanical analysis (DMA) using a Rheometrics Solids Analyzer RSA II operating in tension mode with a frequency of 1.0 rad per second, a strain of 0.01 percent, and a temperature ramp of 2° C. per minute.

The percent haze and percent transmission of light through the cured flat films were determined in accordance with ASTM D1003 method using a BYK-Gardner Hazeguard Plus Hazemeter.

The adhesion was measured for the cured flat film in accordance with ASTM D3359 method.

The color of the cured flat film was determined by measuring L*, a*, and b* using a Gretag Macbeth Color-Eye 7000A colorimeter using L*, a*, b* color space, D65 illuminant, and a 10 degree observer inclusive of a specular reflection. Yellowness index (YI) of the cured flat film was measured using a Gretag Macbeth Color-Eye 7000A colorimeter.

The brightness, or luminance, and color of the cured prism films (or microstructured films) was determined using a Microvision SS220 Display Analysis System. Microvision SS220, a computer based measurement system, uses a goniometric assembly and a mechanical positioner for the collection of in-axis and off-axis data at various locations of the films. The light source used was a LG Philips 12-inch square foot BLM (backlight module) composed of a cold cathode fluorescent lamp (CCFL) attached to the top edge of a rectangular glass panel. An aluminum bar and foam were bundled around the edges of the BLM to preserve heat around the CCFL. Five thermocouples were attached to the BLM frame, and the temperature of CCFL and current to the light source were sampled every four seconds. The brightness measurements were made by utilizing a diffraction grating spectrometer equipped with a collimation optical probe. The microstructured film was mounted on the backlight module. A 13-point test and hemi test were conducted to provide uniformity of brightness over 13 specific locations on the film and the range of viewing angle at the center location of the film. An average of the brightness values was taken. The brightness of backlight changed with CCFL temperature. To remove this variability of brightness, once the light management film was mounted, the CCFL was allowed to reach thermal stability. The temperature-corrected luminance ($L_{corrected}$) was then obtained from the measured luminance ($L_{measured}$), and the measured and corrected temperatures, $T_{measured}$ and $T_{corrected}$, respectively, from equation (1):

$$L_{corrected} = L_{measured} - 6*(T_{measured} - T_{corrected}) \quad \text{(Equation 1)},$$

where the number 6 represents the correction factor, luminance is expressed in candela per meter squared ($cd/m^2$) and temperature is given in degrees Fahrenheit. Finally, the ratio of the temperature-corrected luminance of each sample microstructured film to that of the standard film was calculated to provide the brightness measurement in units of candela per meter squared ($cd/m^2$).

Film flatness was measured by laying a 25 centimeter by 18.5 centimeter microstructured film on a flat surface with the microstructured side facing up and measuring the height of the film edges relative to the flat surface. Two measurements were made per edge and the height was averaged. Each measurement was made approximately 6 centimeters from a corner of the film.

The resistance of the microstructed films to cracking was measured by wrapping 1 inch wide strips of microstructured film around mandrels of different diameters until cracks in the film were visibly apparent. The film strips were cut such that the long edges of the strips formed cross-sections of the prismatic microstructure. The resistance to cracking was represented as the minimum mandrel diameter that did not result in visual cracking.

TABLE 1

Raw material (weight percent in curable formulation)

| Example Number | PTEA | RDX51027 | TSDEA | MPSMA | IRGACURE ® 819 |
|---|---|---|---|---|---|
| 1 | 19.75 | 60 | 19.75 | 0 | 0.5 |
| 2 | 19.75 | 39.87 | 39.88 | 0 | 0.5 |
| 1* | 39.5 | 60 | 0 | 0 | 0.5 |
| 2* | 19.75 | 39.87 | 0 | 39.88 | 0.5 |
| 3* | 0 | 60 | 39.5 | 0 | 0.5 |

*Indicates Comparative Example.

TABLE 2

Measured values for the cured compositions resulting from the curable formulation Examples

| Property | 1 | 2 | 1* | 2* | 3* |
|---|---|---|---|---|---|
| Viscosity (centipoise) | 5840 | 859 | 903 | 1208 | na** |
| RI (liquid) | 1.5968 | 1.5940 | 1.5795 | NA | 1.6173 |
| RI (film) | 1.6230 | 1.6304 | 1.6131 | 1.649 | 1.6388 |

TABLE 2-continued

| | Measured values for the cured compositions resulting from the curable formulation Examples | | | | |
|---|---|---|---|---|---|
| Property | 1 | 2 | 1* | 2* | 3* |
| $T_g$ (° C.) | 68 | 51 | 51 | 99 | 105 |
| Haze (percent) | 0.84 | 0.96 | 0.91 | 1.26 | 1.28 |
| Transmission (percent) | 92 | 92.5 | 92.7 | 90.2 | 88.9 |
| YI | 1.2 | 0.7 | 0.5 | 1.4 | 2.2 |
| Adhesion | 5B | 5B | 5B | 1B | 5B |
| Brightness (cd/m²) | 846.9 | NA | 840.5 | 855.6 | NA |
| Flatness (millimeters) | 0.58 | NA | 0 | 3.18 | NA |
| Mandrel bend (inch) | 3/16 | NA | 1/8 | 1/2 | NA |

*Indicates Comparative Example.
**The viscosity of this composition was too high to be measured.

From the data in Table 2, it is clear that the film resulting from the curable formulation of Example 2 shows an increased refractive index, while maintaining good adhesion and optical clarity, as compared to the film resulting from the curable formulation of Comparative Example 1. Further, the data obtained from the curable formulations of Examples 1 and 2 show that the use of TSDEA instead of MPSMA resulted in films that have better adhesion, optical properties, and mechanical properties as compared to the film obtained from the curable formulation of Comparative Example 2. The brightness enhancement film made using MPSMA showed high warpage and cracking at the edges of the film during the cutting process. The brightness enhancement film of Comparative Example 2 also cracked when bent over a half inch mandrel, whereas the film of Example 2 did not display cracking. The brightness enhancement film of the Comparative Example 2 also showed much more warpage than Example 1.

The invention has been described in detail with particular reference to preferred embodiments thereof, but it will be understood by those skilled in the art that variations and modifications can be effected within the spirit and scope of the invention.

The invention claimed is:

1. A curable formulation comprising:
   (a) at least one multifunctional acrylate having a functionality of at least two;
   (b) at least one mono-acrylate monomer having structure XI

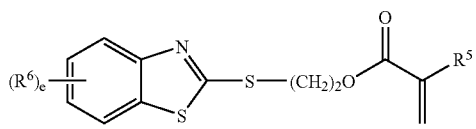

XI wherein $R^5$ is a hydrogen atom, a halogen atom, a $C_1$-$C_{10}$ aliphatic radical, a $C_3$-$C_{10}$ cycloaliphatic radical, or a $C_3$-$C_{10}$ aromatic radical; $R^6$ is independently at each occurrence a hydrogen atom, halogen atom, a $C_1$-$C_{10}$ aliphatic radical, a $C_3$-$C_{10}$ cycloaliphatic radical, or a $C_3$-$C_{10}$ aromatic radical; and "e" is an integer from 1-4;
   (c) at least one heteroatom-containing diacrylate, wherein the heteroatom is selected from the group consisting of sulfur and selenium; and
   (d) at least one curing agent.

2. The curable formulation according to claim 1, wherein said at least one multifunctional acrylate is selected from the group consisting of alkylene glycol di(meth)acrylates, aromatic bisphenol di(meth)acrylates, aliphatic diol di(meth)acrylates, aromatic bisphenol ethoxylate di(meth)acrylates, cycloaliphatic diol di(meth)acrylates, polycyclic diol di(meth)acrylates, aliphatic and aromatic polyol poly(meth)acrylates, aliphatic and aromatic alkylene ether polyol poly(meth)acrylates, aliphatic urethane di(meth)acrylates; and copolymers and blends comprising at least one of the foregoing multifunctional acrylates.

3. The curable formulation of claim 1, wherein said at least one multifunctional acrylate is selected from the group consisting of bisphenol A di(meth)acrylate; ethylene glycol di(meth)acrylate; 1,4-butanediol di(meth)acrylate; 1,6-hexanediol di(meth)acrylate; 1,3-propylene glycol di(meth)acrylate; tetramethylene glycol di(meth)acrylate; 2-butyl-2-ethyl-1,3-propane diol di(meth)acrylate; neopentyl glycol di(meth)acrylate; alkoxylated 1,4-cyclohexanedimethanol di(meth)acrylate; pentaerythritol tetra(meth)acrylate; alkoxylated pentaerythritol tetra(meth)acrylate; glycerol tri(meth)acrylate; glycerol propoxylated tri(meth)acrylate; trimethylolpropane tri(meth)acrylate; tris(2-hydroxyethyl) isocyanurate triacrylate; polybutadiene diacrylate; polyisoprene diacrylate; 1,3-bis(acryloyloxyethoxy)isophorone diurethane; bis(acryloyloxyethoxy)toluene diurethane; 2,2-bis{4-(2-acryloyloxy ethyleneoxy)-(3,5-di bromophenyl)}propane; 2,2-bis{4-omega-acryloyloxy polyethyleneoxy)-(3,5-di bromophenyl)}propane; 2,2-bis{4-(omega-(methacryloyloxy polyethyleneoxy) phenyl}propane; and 2,2-bis{4-(omega-(metha)acryloyloxy polypropyleneoxy)phenyl}propane; and mixtures comprising at least one of the foregoing multifunctional acrylates.

4. The curable formulation of claim 1, further comprising at least one mono-acrylate selected from the group consisting of aliphatic mono(meth)acrylates, aryl mono(meth)acrylates, cycloaliphatic mono(meth)acrylates, alkylene glycol alkyl ether mono(meth)acrylates, alkylene glycol mono(meth)acrylates, alkylene glycol alkyl ether mono(meth)acrylates, alkylene glycol aryl ether mono(meth)acrylates, glycol-based and bisphenol-based mono(meth)acrylates, and glycidyl-substituted mono(meth)acrylates.

5. The curable formulation according to claim 1, further comprising at least one mono-acrylate selected from the group consisting of methyl (meth)acrylate; ethyl (meth)acrylate; butyl (meth)acrylate; 2-ethylhexyl (meth)acrylate; octyl (meth)acrylate; isodecyl (meth)acrylate; dodecyl (meth)acrylate; octadecyl (meth)acrylate; cyclohexyl (meth)acrylate; 4-methylcyclohexyl (meth)acrylate; isobornyl (meth)acrylate; adamantyl (meth)acrylate; phenyl (meth)acrylate; benzyl (meth)acrylate; 1-naphthyl (meth)acrylate; 4-fluorophenyl (meth)acrylate; 4-chlorophenyl (meth)acrylate; 4-bromophenyl (meth)acrylate; 2,4,6-tribromophenyl (meth)acrylate; 4-methoxyphenyl (meth)acrylate; 4-cyanophenyl (meth)acrylate; 4-phenylphenyl (meth)acrylate; 2-bromobenzyl (meth)acrylate; 2-fluoroethyl (meth)acrylate; 2-chloroethyl (meth)acrylate; 2-bromoethyl (meth)acrylate; trichloromethyl (meth)acrylate; 2-hydroxyethyl (meth)acrylate; 2-hydroxypropyl (meth)acrylate; 2-(2-ethoxyethoxy)ethyl acrylate; propylene glycol 4-nonylphenylether acrylate; glycidyl (meth)acrylate; N-butylaminoethyl (meth)acrylate; alpha-fluoro (meth)acrylate; alpha-cyano (meth)acrylate; 2,2,2-trifluoroethyl methacrylate; pentafluoropropyl methacrylate; 1,3-bis(thiophenyl)propan-2-yl acrylate; 1,3-bis(phenoxy)propan-2-yl (meth)acrylate; 1,3-bis(2,4,6-tribromophenoxy)propan-2-yl (meth)acrylate;

1,3-bis(2-mercaptobenzothiazoyl)propan-2-yl (meth)acrylate; 2-(4-chlorophenoxy)-1-[(phenylthio)methyl]ethyl (meth)acrylate; 4-bromobenzyl (meth)acrylate; tribromobenzyl (meth)acrylate; pentabromobenzyl (meth)acrylate; 2-(2-benzothiazolyl)thioethyl acrylate; and 2-phenylthioethyl acrylate; and mixtures comprising at least one of the foregoing mono-acrylates.

6. The curable formulation according to claim 1, wherein said at least one heteroatom-containing diacrylate comprises structure XIII

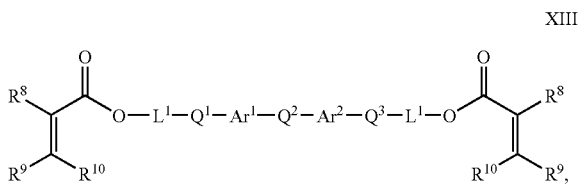

wherein $R^8$, $R^9$, and $R^{10}$ are independently at each occurrence a hydrogen atom, a halogen atom, a $C_1$-$C_{10}$ aliphatic radical, a $C_3$-$C_{10}$ cycloaliphatic radical, or a $C_3$-$C_{10}$ aromatic radical; $L^1$ and $L^2$ are independently at each occurrence a divalent $C_1$-$C_{10}$ aliphatic radical, a divalent $C_3$-$C_{10}$ cycloaliphatic radical, or a divalent $C_3$-$C_{10}$ aromatic radical; $Q^1$, $Q^2$, and $Q^3$ are independently at each occurrence a bond, an oxygen atom, a carbonyl group, a thiocarbonyl group, a carbonyloxy group, an oxycarbonyl group, a sulfur atom, a selenium atom, a disulfide group, a diselenide group, a selenosulfide group, a sulfoxide group, a sulfone group, a selenoxide group or a selenone group, wherein at least one of $Q^1$, $Q^2$, and $Q^3$ comprises a sulfur atom or a selenium atom; and $Ar^1$ and $Ar^2$ are independently $C_3$-$C_{10}$ divalent aromatic radicals.

7. The curable formulation according to claim 6, wherein said at least one heteroatom-containing diacrylate comprises diacrylates having formulae XIV, XV, and XVI

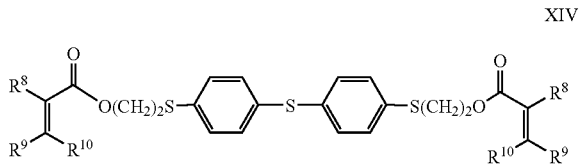

and

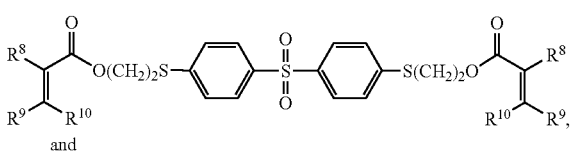

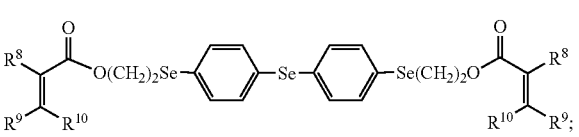

wherein $R^8$, $R^9$ and $R^{10}$ are independently at each occurrence a hydrogen atom, a halogen atom, a $C_1$-$C_{10}$ aliphatic radical, a $C_3$-$C_{10}$ cycloaliphatic radical, or a $C_3$-$C_{10}$ aromatic radical.

8. The curable formulation according to claim 1, wherein said at least one curing agent is selected from the group consisting of photosensitive curing agents and thermally sensitive curing agents.

9. The curable formulation according to claim 8, wherein said photosensitive curing agent is selected from the group consisting of 1-hydroxycyclohexyl phenyl ketone, benzophenone; 2-methyl-1-[4-(methylthio)phenyl]-2-morpholino propan-1-one; [2-benzyl-2-N,N-dimethylamino-1-(4-morpholinophenyl)-1-butanone]; 2,2-dimethoxy-2-phenylacetophenone; bis(2,6-dimethoxybenzoyl-2,4-,4-trimethyl pentyl phosphine oxide; 2-hydroxy-2-methyl-1-phenyl-propan-1-one; 2,4,6-trimethylbenzoyldiphenylphosphine oxide; 2-hydroxy 2-methyl-1-phenyl-propan-1-one; mixed triarylsulfonium hexafluoroantimonate salts; mixed triarylsulfonium hexafluorophosphate salts; d1-camphorquinone; benzil dimethyl ketal; mixtures of benzoin and butyl ethers, trimethylbenzophenone blend; alpha-hydroxyketones; polymeric hydroxy ketones; triphenylphosphine oxide; 2-isopropylthioxanthone; 4-isopropylthioxanthone; ethyl 4-(dimethylamino)benzoate; diaryliodonium hexafluoroantimonates; bis(2,4,6-trimethylbenzoyl)phenylphosphine oxide; and mixtures comprising two or more of the foregoing photosensitive curing agents.

10. The curable formulation according to claim 8, wherein said thermally sensitive curing agent is selected from the group consisting of peroxides, hydroperoxides, azo compounds, and combinations thereof.

11. The curable formulation according to claim 10, wherein said peroxide comprises at least one of 2,4-pentanedione peroxide; di(n-propyl)peroxydicarbonate; di(s-butyl)peroxydicarbonate; di(2-ethylhexyl)peroxydicarbonate; diisononanoyl peroxide; benzoyl peroxide; alpha.-cumylperoxyneodecanoate; 1,1-dimethyl-3-hydroxy-butyl peroxyneoheptanoate; alpha-cumyl peroxyneoheptanoate; t-amylperoxyneodecanoate; t-butylperoxyneodecanoate; t-amylperoxypivalate; t-butylperoxypivalate; 1-1-dimethyl-3-hydroxy-butylperoxy-2-ethylhexanoate; 1,1-dimethyl-3-hydroxy-butylperoxy-2-ethylhexanoate; 2,5-dimethyl-2,5-di(2-ethylhexanoyl peroxy)hexane; t-amylperoxy-2-ethylhexanoate; t-butylperoxy-2-ethylhexanoate; t-butyl peroxyisobutyrate; t-butyl peroxymaleic acid; t-butyl peroxyacetate; t-amyl peroxyacetate; di-t-butyl diperoxyphthalate; O,O-t-butyl-O-isopropyl monoperoxycarbonate; 2,5-dimethyl-2,5-di(benzoylperoxy)hexane; O,O-t-butyl-O-(2-ethylhexyl)monoperoxycarbonate; O,O-t-amyl-O-(2-ethylhexyl)monoperoxycarbonate; dicumyl peroxide; 2,5-dimethyl-2,5-di-(t-butylperoxy)hexane; t-butyl cumyl peroxide; t-butyl cumyl peroxide; alpha,alpha-bis(t-butylperoxy)diisopropylbenzene; 2,5-dimethyl-2,5-di-(t-butylperoxy)-3-hexyne; 2,5-dihydroperoxy-2,5-dimethylhexane; n-butyl-4,4-di-(t-butylperoxy)valerate; 1,1-di(t-butylperoxy)-3,3,5-trimethylcyclohexane; 1,1-di(t-butylperoxy)cyclohexane; 1,1-di(t-amylperoxy)cyclohexane; 2,2-di(t-butylperoxy)butane; ethyl-3,3-di(t-butylperoxy)butyrate; 2,2-di-(t-amylperoxy)propane; ethyl 3,3-di(t-amylperoxy) butyrate; and mixtures comprising one or more of the foregoing thermally sensitive curing agents.

12. The curable formulation according to claim 10, wherein said azo compound is selected from the group consisting of 2,2'-azo-bisisobutyronitrile, 1,1'-azobis(cyclohexanecarbonitrile), and mixtures thereof.

13. A curable formulation comprising:
(a) at least one multifunctional acrylate having a functionality of at least two;

(b) at least one mono-acrylate monomer selected from the group consisting of 1,3-bis(2-mercaptobenzothiazoyl) propan-2-yl (meth)acrylate; 1,3-bis(2-mercaptobenzothiazoyl)pronan-2-yl acrylate;

(c) at least one heteroatom-containing diacrylate XIII

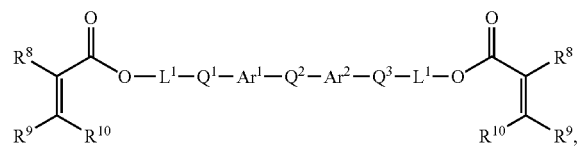

XIII wherein $R^8$, $R^9$, and $R^{10}$ are independently at each occurrence a hydrogen atom, a halogen atom, a $C_1$-$C_{10}$ aliphatic radical, a $C_3$-$C_{10}$ cycloaliphatic radical, or a $C_3$-$C_{10}$ aromatic radical; $L^1$ and $L^2$ are independently at each occurrence a divalent $C_1$-$C_{10}$ aliphatic radical, a divalent $C_3$-$C_{10}$ cycloaliphatic radical, or a divalent $C_3$-$C_{10}$ aromatic radical; $Q^1$, $Q^2$, and $Q^3$ are independently at each occurrence a bond, an oxygen atom, a carbonyl group, a thiocarbonyl group, a carbonyloxy group, an oxycarbonyl group, a sulfur atom, a selenium atom, a disulfide group, a diselenide group, a selenosulfide group, a sulfoxide group, a sulfone group, a selenoxide group or a selenone group, wherein at least one of $Q^1$, $Q^2$, and $Q^3$ comprises a sulfur atom or a selenium atom; and $Ar^1$ and $Ar^2$ are independently $C_3$-$C_{10}$ divalent aromatic radicals; and (d) at least one curing agent.

14. The curable formulation of claim 13, wherein said multifunctional acrylate having a functionality of at least two comprises a substance having a formula (II)

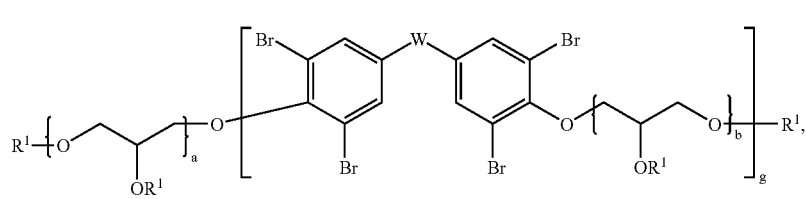

II wherein W is a bond, an oxygen atom, a $C_1$-$C_{10}$ aliphatic radical, a $C_5$-$C_{20}$ cycloaliphatic radical, or a $C_3$-$C_{20}$ aromatic radical; and "a", "b", and "g" are each independently greater than or equal to 1; and each $R^1$ independently at each occurrence is a hydrogen atom or an acryloyl group having a formula (III),

III wherein $R^2$ is independently at each occurrence a hydrogen atom, a halogen atom, a $C_1$-$C_{10}$ aliphatic radical, a $C_5$-$C_{10}$ cycloaliphatic radical, or a $C_3$-$C_{10}$ aromatic radical.

15. The curable formulation of claim 13, wherein said multifunctional acrylate having a functionality of at least two comprises an oligomeric acrylate having a formula (IV)

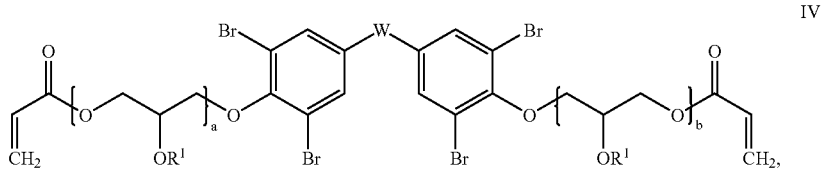

IV wherein W is a bond, an oxygen atom, a $C_1$-$C_{10}$ aliphatic radical, a $C_5$-$C_{20}$ cycloaliphatic radical, or a $C_3$-$C_{20}$ aromatic radical; "a" and "b" are each independently greater than or equal to 1; and each $R^1$ independently at each occurrence is atom or an acryloyl group having a formula (III)

III wherein $R^2$ is independently at each occurrence a hydrogen atom, a halogen atom, a $C_1$-$C_{10}$ aliphatic radical, a $C_5$-$C_{10}$ cycloaliphatic radical, or a $C_3$-$C_{10}$ aromatic radical.

* * * * *